United States Patent  
Koseck et al.

(10) Patent No.: US 12,288,945 B2
(45) Date of Patent: Apr. 29, 2025

(54) CLAMPING CONNECTOR

(71) Applicant: Tyco Fire Products LP, Lansdale, PA (US)

(72) Inventors: Kyle Koseck, South Salt Lake, UT (US); Brian L. Counts, Menominee, MI (US)

(73) Assignee: Tyco Fire Products LP, Cranston, RI (US)

( * ) Notice: Subject to any disclaimer, the term of this patent is extended or adjusted under 35 U.S.C. 154(b) by 725 days.

(21) Appl. No.: 17/616,060

(22) PCT Filed: Jun. 3, 2020

(86) PCT No.: PCT/IB2020/055239
§ 371 (c)(1),
(2) Date: Dec. 2, 2021

(87) PCT Pub. No.: WO2020/245742
PCT Pub. Date: Dec. 10, 2020

(65) Prior Publication Data
US 2022/0302647 A1    Sep. 22, 2022

Related U.S. Application Data

(60) Provisional application No. 62/857,536, filed on Jun. 5, 2019.

(51) Int. Cl.
*H01R 13/44* (2006.01)
*H01R 13/207* (2006.01)
(Continued)

(52) U.S. Cl.
CPC ......... *H01R 13/639* (2013.01); *H01R 13/207* (2013.01); *H01R 13/501* (2013.01); *H01R 13/521* (2013.01)

(58) Field of Classification Search
CPC .. H01R 13/639; H01R 13/267; H01R 13/501; H01R 13/207
See application file for complete search history.

(56) References Cited

U.S. PATENT DOCUMENTS 4,169,643 A    10/1979   Gallagher
4,433,206 A *   2/1984   Lewis ............... H01R 13/6592
                                                  174/76

(Continued)

FOREIGN PATENT DOCUMENTS

CN    1161763 A    10/1997
CN    2427820      4/2001

(Continued)

OTHER PUBLICATIONS

International Search Report and Written Opinion on PCT PCT/IB2020/055239, mail date Aug. 31, 2020, 10 pages.

*Primary Examiner* — Neil Abrams
(74) *Attorney, Agent, or Firm* — Foley & Lardner LLP

(57) ABSTRACT

The clamping connector includes first and second shell members, each including a tab and a protrusion extending from a first side, and a hinge aperture on a second side. The protrusion of the first shell member extends into a tab aperture of the tab of the second shell member and when the first shell member is secured to the second shell member the protrusion of the second shell member extends into a tab aperture of the tab of the first shell member. The clamping connector includes a hinge pin received by the hinge apertures of the first and second shell members to rotatably couple the first and second shell members. The clamping connector also includes a seal and a plurality of seal apertures extending from an interior of the clamping connector, the at least one seal extending partially through the plurality of seal apertures.

20 Claims, 14 Drawing Sheets

(51) Int. Cl.
*H01R 13/50* (2006.01)
*H01R 13/52* (2006.01)
*H01R 13/639* (2006.01)

(56) References Cited

U.S. PATENT DOCUMENTS

| | | | | |
|---|---|---|---|---|
| 4,998,894 A * | 3/1991 | Gronvall | ............ | H01R 13/5216 |
| | | | | 439/936 |
| 5,217,387 A * | 6/1993 | Hull | ................... | H01R 13/6392 |
| | | | | 439/367 |
| 5,368,500 A * | 11/1994 | Dedering | ........... | H01R 13/6392 |
| | | | | 439/367 |
| 5,684,274 A * | 11/1997 | McLeod | ................... | H01R 4/70 |
| | | | | 174/92 |
| 6,087,593 A * | 7/2000 | Skipworth | ............. | H02G 11/00 |
| | | | | 174/136 |
| 6,155,610 A | 12/2000 | Godeau et al. | | |
| 6,454,576 B1 * | 9/2002 | Hedrick | ............. | H01R 13/5812 |
| | | | | 439/369 |
| 6,955,558 B1 * | 10/2005 | Low | ........................ | H02G 15/18 |
| | | | | 439/587 |
| 7,063,550 B1 * | 6/2006 | Chen | ................... | H01R 13/5219 |
| | | | | 439/320 |
| 7,141,738 B2 | 11/2006 | Marsac et al. | | |
| 7,179,100 B2 * | 2/2007 | Montena | ................. | H01R 13/73 |
| | | | | 439/133 |
| 8,841,553 B2 | 9/2014 | Dower et al. | | |
| 9,831,624 B2 * | 11/2017 | Garvey | .................. | H01R 24/30 |
| 9,837,807 B2 * | 12/2017 | Zhai | ..................... | H02G 15/113 |
| 11,605,918 B2 * | 3/2023 | Liniger | .................. | H02G 15/04 |
| 2005/0003698 A1 | 1/2005 | Hata | | |
| 2005/0075000 A1 | 4/2005 | Wu | | |
| 2005/0167147 A1 | 8/2005 | Marsac et al. | | |
| 2011/0075971 A1 | 3/2011 | Elenbaas | | |
| 2019/0157848 A1 | 5/2019 | Boren | | |

FOREIGN PATENT DOCUMENTS

| | | |
|---|---|---|
| CN | 2427820 Y | 4/2001 |
| CN | 1691424 A | 11/2005 |
| CN | 201994622 U | 9/2011 |
| CN | 105144514 A | 12/2015 |
| CN | 105144525 A | 12/2015 |
| WO | WO-2014/130197 A2 | 8/2014 |
| WO | WO-2016/178796 A1 | 11/2016 |

* cited by examiner

# CLAMPING CONNECTOR

CROSS-REFERENCE TO RELATED PATENT APPLICATIONS

This application claims the benefit of and priority to U.S. Provisional Application No. 62/857,536, filed Jun. 5, 2019, which is incorporated herein by reference in its entirety.

BACKGROUND

Fire suppression systems are commonly used to protect an area and objects within the area from fire. Fire suppression systems can be activated manually or automatically in response to an indication (e.g., from a sensor, etc.) that a fire is present nearby (e.g., an increase in ambient temperature beyond a predetermined threshold value, etc.). Fire suppression systems commonly utilize wire-to-wire connections to electrically couple various electrical components of the fire suppression system. These connections transmit various signals, such as signals indicating the presence of a fire, to a control system. Wire connections can experience harsh conditions (e.g., vibration, elements, contact with contaminants or corrosive chemicals, etc.) throughout the life of the system. If these connections become damaged or disconnected, components may no longer be able to communicate with one another effectively, and performance of the system may be compromised.

SUMMARY

One embodiment relates to a clamping connector. The clamping connector includes a first shell member and a second shell member. The first shell member and the second shell member each include a tab extending from a first side, which defines a tab aperture and a protrusion extending from the first side. The first shell member and the second shell member each also include a hinge aperture, which is oriented along a first axis on a second side. When the first shell member is secured to the second shell member the protrusion of the first shell member extends into the tab aperture of the tab of the second shell member and the protrusion of the second shell member extends into the tab aperture of the tab of the first shell member. The clamping connector further includes a hinge pin, which is received by the hinge apertures of the first and second shell members to rotatably couple the first shell member and the second shell members.

Another embodiment relates to a connection assembly including: a first electrical connector; a second electrical connector which engages with the first electrical connector; such that the first electrical connector and the second electrical connector are selectively coupled. The connection assembly also includes: a sleeve able to receive the first electrical connector and the second electrical connector; and a clamping connector which is removably coupled to the sleeve.

Another embodiment relates to a method of connecting a plurality of electrical connectors beginning with, selectively coupling a first electrical connector to a second electrical connector to create a connection. Followed by, engaging a first threading of the first electrical connector to a second threading of the second electrical connector. The method of connecting then consisting of, removably coupling a sleeve to the connection and removably coupling a clamping connector to the sleeve This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
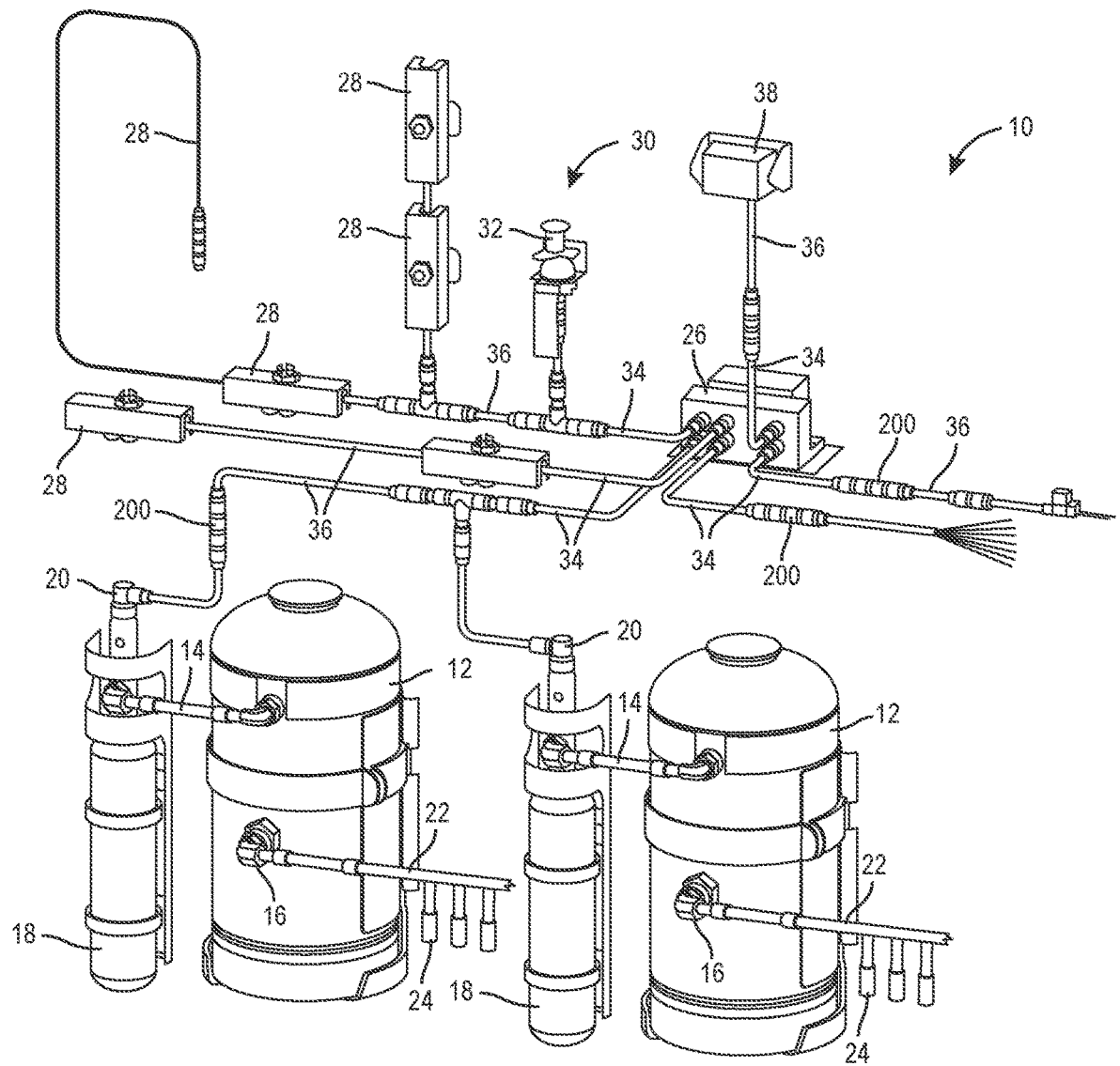
FIG. 1 is a schematic of a fire suppression system, according to an exemplary embodiment.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Specific areas or objects (e.g., engines, kitchens, buildings, etc.) can contain combustible fluid or objects (e.g., fuel, engine oil, hydraulic oil, grease, wood beams, etc.). In the event a heated object (e.g., sparks, handheld fire starters, etc.) or the combustible fluid contacts a heated surface (e.g., engine, oven, pressure fryer, etc.), the combustible fluid can create a fire.

Fire suppression systems including fire suppressant agent, nozzles, controllers, etc. are generally utilized in the specific areas or objects to stop the fire once it has formed. Fire suppression systems can be automatically actuated or manually actuated. The actuating signals are transmitted between components by means of electrical wiring. The electrical wiring includes electrical wire connections between the wiring of the components. The connection between the components may be lost due to conditions (e.g., vibration, water, chemicals, etc.).

The loss of connection between components of the fire suppression system may cause malfunctions in the fire suppression system. For example, the loss of connection may cause the controller to send an electrical signal to the components in the fire suppression system informing the components that a fire has occurred. The components of the fire suppression system may then activate in response to the electrical signal, causing an actuator to puncture a cartridge releasing gas to flow into a fire suppression tank and releasing the fire suppressant agent, rendering the fire suppression system useless until the used components (e.g., fire suppression agent) are replaced.

A clamping connector may be implemented to limit the loss of connection between the components of the fire suppression system. The clamping connector is configured to compress a sleeve onto the electrical wire connection, which dampens vibration and limits harmful elements (e.g., mud, water, chemicals, etc.) from entering.

Referring generally to the Figures, an electrical connector assembly includes a male electrical connector, a female electrical connector, a sleeve, and a clamping connector. To assemble the electrical connector assembly, the male electrical connector is connected (e.g., electrically coupled, etc.) to the female electrical connector (e.g., by screwing the connectors together, etc.). The sleeve is placed around the male electrical connector and the female electrical connector. A clamping connector assembly is placed around the sleeve. The clamping connector is configured to limit separation of the male electrical connector and the female electrical connector, which facilitates limiting of signal loss between components of a fire suppression system.

Referring to FIG. 1, a fire suppression system 10 is shown according to an exemplary embodiment. In one embodiment, the fire suppression system 10 is a chemical fire suppression system. The fire suppression system 10 is configured to dispense or distribute a fire suppressant agent onto and/or nearby a fire, extinguishing the fire and limiting the fire from spreading. The fire suppression system 10 can be used alone or in combination with other types of fire suppression systems (e.g., a building sprinkler system, a handheld fire extinguisher, etc.). In some embodiments, multiple fire suppression systems 10 are used in combination with one another to cover a larger area (e.g., each in different rooms of a building).

The fire suppression system 10 can be used in a variety of different applications. Different applications can require different types of fire suppressant agent and different levels of mobility. The fire suppression system 10 is usable with a variety of different fire suppressant agents, such as powders, liquids, foams, or other fluid or flowable materials. The fire suppression system 10 can be used in a variety of stationary applications. By way of example, the fire suppression system 10 is usable in kitchens (e.g., for oil or grease fires, etc.), in libraries, in data centers (e.g., for electronics fires, etc.), at filling stations (e.g., for gasoline or propane fires, etc.), or in other stationary applications. Alternatively, the fire suppression system 10 can be used in a variety of mobile applications. By way of example, the fire suppression system 10 can be incorporated into land-based vehicles (e.g., racing vehicles, forestry vehicles, construction vehicles, agricultural vehicles, mining vehicles, passenger vehicles, refuse vehicles, etc.), airborne vehicles (e.g., jets, planes, helicopters, etc.), or aquatic vehicles, (e.g., ships, submarines, etc.).

Referring again to FIG. 1, the fire suppression system 10 includes one or more fire suppressant tanks 12 (e.g., vessels, containers, vats, drums, tanks, canisters, cartridges, cans, etc.). The fire suppressant tank 12 is filled (e.g., partially, completely, etc.) with fire suppressant agent. In some embodiments, the fire suppressant agent is normally not pressurized (e.g., is near atmospheric pressure). The fire suppressant tank 12 includes an exchange section, shown as hose 14 and an outlet section (e.g., an aperture, a valve, etc.), shown as outlet valve 16. The hose 14 permits the flow of expellant gas into the fire suppressant tank 12 and the flow of fire suppressant agent out of the fire suppressant tank 12 through the outlet valve 16 so that the fire suppressant agent can be supplied to a fire.

The fire suppression system 10 further includes a cartridge 18 (e.g., a vessel, container, vat, drum, tank, canister, cartridge, or can, etc.). The cartridge 18 is configured to contain a volume of pressurized expellant gas. The expellant gas can be an inert gas. In some embodiments, the expellant gas is air, carbon dioxide, or nitrogen. The cartridge 18 can be rechargeable or disposable after use.

The fire suppression system 10 further includes a valve, puncture device, or activator assembly, shown as actuator 20. The actuator 20 is configured to selectively fluidly couple the cartridge 18 to the fire suppressant tank 12 to facilitate activation of the fire suppression system 10. Decoupling the cartridge 18 from the actuator 20 may facilitate removal and replacement of the cartridge 18 when the cartridge 18 is depleted.

Once the actuator 20 is activated and the cartridge 18 is fluidly coupled to the hose 14, the expellant gas from the cartridge 18 flows freely through the hose 14. The expellant gas forces fire suppressant agent from the fire suppressant tank 12 out through the outlet valve 16 and into a conduit or hose, shown as pipe 22. In one embodiment, the hose 14 directs the expellant gas from the cartridge 18 to the fire suppressant tank 12 (e.g., to a top portion of the fire suppressant tank 12). The pressure of the expellant gas within the fire suppressant tank 12 forces the fire suppressant agent to exit through the outlet valve 16. In other embodiments, the expellant gas enters a bladder within the fire suppressant tank 12, and the bladder presses against the fire suppressant agent to force the fire suppressant agent out through the outlet valve 16. In some embodiments, the fire suppressant tank 12 includes a burst disk that limits the fire suppressant agent from flowing out through the hose 14 until the pressure within the fire suppressant tank 12 exceeds a threshold pressure. Once the pressure exceeds the threshold pressure, the burst disk ruptures, permitting the flow of fire suppressant agent. Alternatively, the fire suppressant tank 12 can include a valve, a puncture device, or another type of opening device or activator assembly that is configured to fluidly couple the fire suppressant tank 12 to the pipe 22 in response to the pressure within the fire suppressant tank 12 exceeding the threshold pressure. Such an opening device can be configured to activate mechanically (e.g., the force of the pressure causes the opening device to activate, etc.), fluidly (e.g., using a pressurized liquid or gas), or electrically (e.g., in response to receiving an electrical signal from a controller). The opening device may include a separate pressure sensor in communication with the fire suppressant tank 12 that causes the opening device to activate.

The pipe 22 is fluidly coupled to one or more outlets or sprayers, shown as nozzles 24. The fire suppressant agent flows through the pipe 22 and to the nozzles 24. The nozzles 24 each define one or more apertures, through which the fire suppressant agent exits, forming a spray of fire suppressant agent that covers a desired area. The sprays from the nozzles 24 then suppress or extinguish fire within that area. The apertures of the nozzles 24 can be shaped to control the spray pattern of the fire suppressant agent leaving the nozzles 24. The nozzles 24 can be aimed such that the sprays cover specific points of interest (e.g., a specific piece of restaurant equipment, a specific component within an engine compartment of a vehicle, etc.). The nozzles 24 can be configured such that all of the nozzles 24 activate simultaneously, or the nozzles 24 can be configured such that only the nozzles 24 near the fire are activated.

The fire suppression system 10 further includes a controller 26 that controls the activation of the actuator 20. The controller 26 is configured to monitor one or more conditions and determine if those conditions are indicative of a nearby fire. Upon detecting a nearby fire, the controller 26 activates the actuator 20, causing the fire suppressant agent to leave the nozzles 24 and extinguish the fire.

The actuator 20 can be configured to activate in response to receiving an electrical signal from the controller 26. Referring to FIG. 1, the controller 26 monitors signals from one or more sensors, shown as temperature sensors 28 (e.g., linear thermal detector, spot thermal detector, etc.). The controller 26 can use the signals from the temperature sensors 28 to determine if an ambient temperature has exceeded a threshold temperature. Upon determining that the ambient temperature has exceeded the threshold temperature, the controller 26 provides an electrical signal to the actuator 20. The actuator 20 then activates in response to receiving the electrical signal.

The fire suppression system 10 further includes a manual activation system 30 that controls the activation of the actuator 20. The manual activation system 30 is configured to activate the actuator 20 in response to an input from an operator. The manual activation system 30 can be included instead of or in addition to the controller 26. Both the controller 26 and the manual activation system 30 can activate the actuator 20 independently. By way of example, the controller 26 can activate the actuator 20 regardless of any input from the manual activation system 30, and vice versa.

The actuator 20 can additionally or alternatively be configured to activate in response to receiving an electrical signal from the manual activation system 30. As shown in FIG. 1, the button 32 is operably coupled to the controller 26. By way of example, the controller 26 can be configured to monitor a signal from the button 32 to determine if the button 32 is pressed. Upon detecting that the button 32 has been pressed, the controller 26 sends an electrical signal to the actuator 20 to activate the actuator 20.

The controller 26 can be configured to monitor the status of and output information to a human interface device 38 (e.g., engaged, disengaged, etc.). Upon determining that the human interface device 38 is engaged, the controller provides electrical signals to the human interface device 38. By way of example, the controller 26 receives a first electrical signal from either the manual activation device 60 or the temperature sensors 28 that the button 32 has been pressed or the temperature has reached the threshold temperature. In response to the first electrical signal, a second electrical signal is sent from the controller 26 to the human interface device 38. The second electrical signal is configured to notify a user by way of a notification device (e.g., an LED, an auditory signal, etc.) on the human interface device 38.

In some embodiments, the human interface device 38 and the controller 26 are configured to be the same device, such that the controller 26 incorporates notification devices directly into the controller 26. The controller 26 is then configured to replace the human interface device 38 in the fire suppression system 10.

An electrical wire 36 is utilized for the transfer of the electrical signals in response to the activation of the manual activation system 30 or the temperature sensors 28 determine that the ambient temperature has exceeded the threshold temperature. The electrical signals are sent from the manual activation system 30 and/or one or more of the temperatures sensors 58 through the electrical wire 36 and quick attach wires 34 to the controller 26. The electrical wires 36 and the quick attach wires 34 are connected through an electrical wire connection 200.

Figure 2:
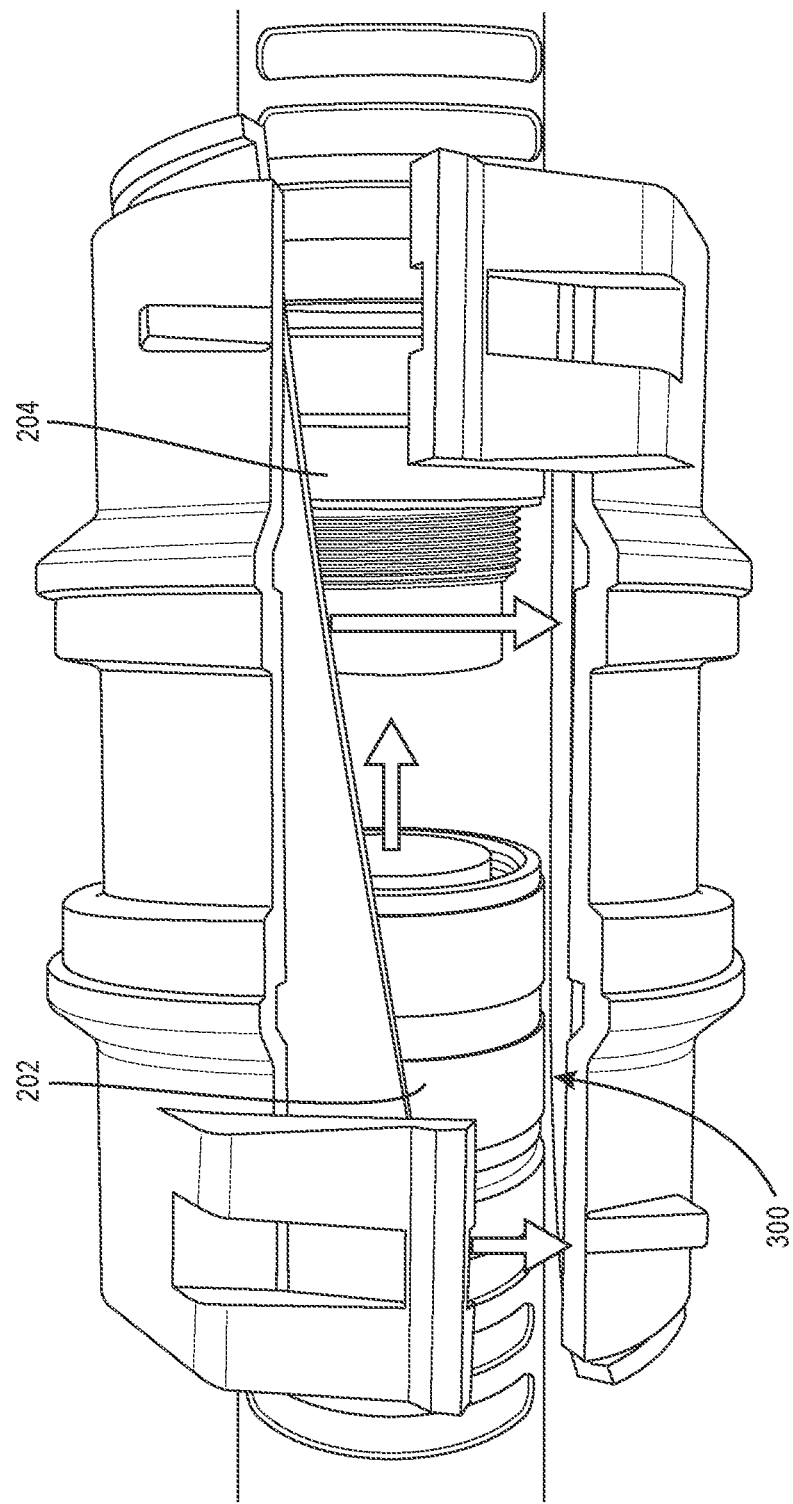
FIG. 2 is a perspective view of a connection assembly of the fire suppression system of FIG. 1 in an unassembled configuration, according to an exemplary embodiment.

Referring to FIG. 2, the electrical wire connection 200 is shown according to an exemplary embodiment. The electrical connector assembly 200 includes a first electrical connector 202, a second electrical connector 204, and an electrical connection assembly 300.

Figure 3A:
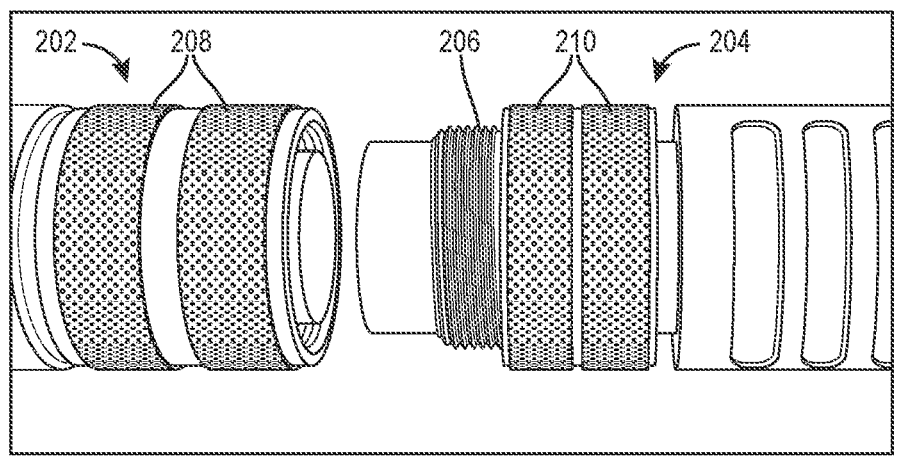
FIG. 3A is a perspective view of a male electrical connector and a female electrical connector in a disconnected configuration, according to an exemplary embodiment.
Figure 4A:
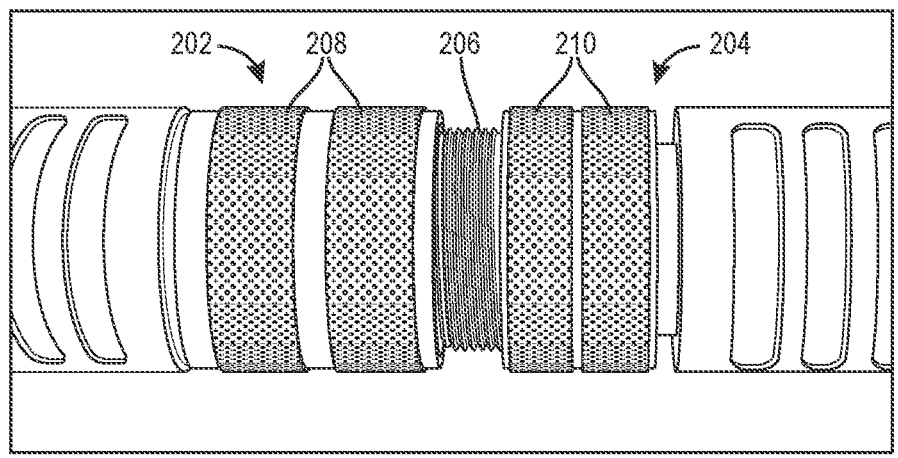
FIG. 4A is a perspective view of the male electrical connector and the female electrical connector of FIG. 3A in a partially connected configuration, according to an exemplary embodiment.

As shown in FIGS. 3A-5B, the first electrical connector 202 is a male electrical connector and the second electrical connector 204 is a female electrical connector. FIGS. 3A and 3B show a fully open position of the connection between the first electrical connector 202 and the second electrical connector 204. In this position, no electrical signals are able to be transmitted between the components of the fire suppression system 10 (e.g., the controller 26, the button 32, etc.) by means of the connection between the first electrical connector 202 and the second electrical connector 204. FIGS. 4A and 4B show a semi-closed position of the connection between the first electrical connector 202 and the second electrical connector 204. In this position, electrical signals may be transmitted between the components of the fire suppression system 10. However, vibrations and harsh conditions (e.g., dirt, chemical, water, etc.) may disconnect the first electrical connector 202 from the second electrical connector 204 and cause faulty or poor electrical signal transmittance between the components of the fire suppression system 10. The second electrical connector 204 includes a threading 206. The threading 206 limits separation of the first electrical connector 202 from the second electrical connector 204 while connected. In some embodiments, the first electrical connector 202 includes a first textured region 208 and the second electrical connector 204 includes a second textured region 210. The first textured region 208 and the second textured region 210 define an interface region for the user to grip the first electrical connector 202 and the second electrical connector 204 during connection or disconnection.

Figure 5A:
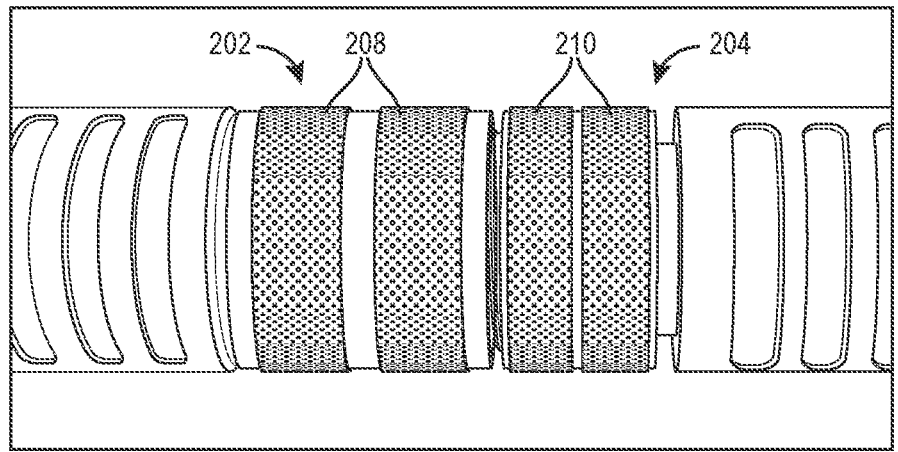
FIG. 5A is a perspective view of the male electrical connector and the female electrical connector of FIG. 4A in a fully connected configuration, according to an exemplary embodiment.
Figure 3B:
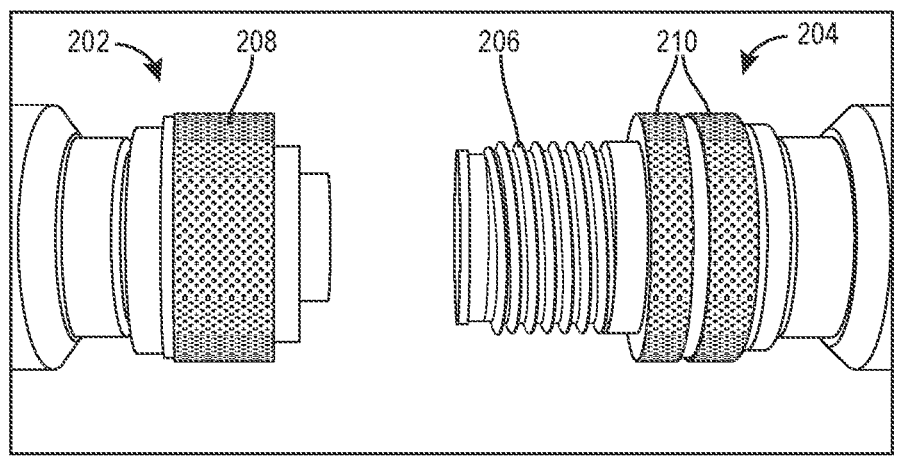
FIG. 3B is a perspective view of a male electrical connector and a female electrical connector in a disconnected configuration, according to another exemplary embodiment.
Figure 4B:
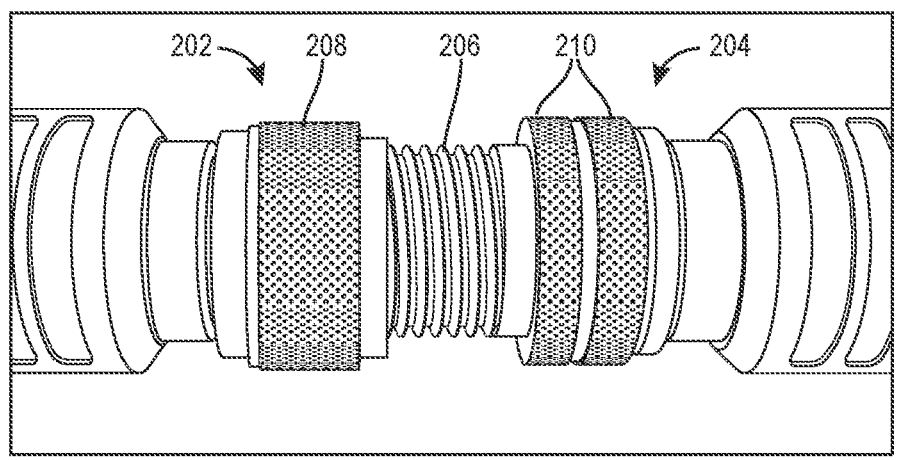
FIG. 4B is a perspective view of the male electrical connector and the female electrical connector of FIG. 3B in a partially connected configuration, according to an exemplary embodiment.
Figure 5B:
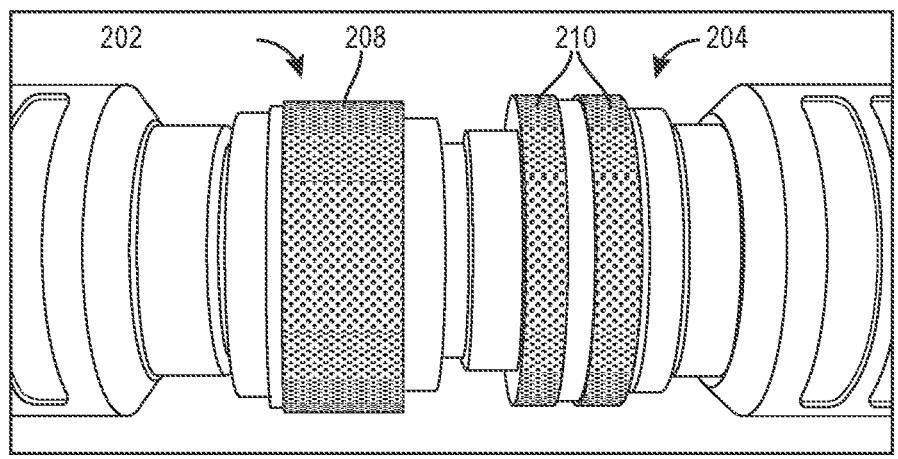
FIG. 5B is a perspective view of the male electrical connector and the female electrical connector of FIG. 4B in a fully connected configuration, according to an exemplary embodiment.

FIGS. 5A and 5B show a fully closed position of the connection between the first electrical connector 202 and the second electrical connector 204. In the fully closed position vibrations and harsh conditions of the environment may have a smaller impact on the transmittance of electrical signals between the components of the fire suppression system 10 than a partially closed or open position. The threading 206 is fully engaged with a second threading disposed within the first electrical connector 202 to couple the first electrical connector 202 to the second electrical connector 204.

Figure 6:
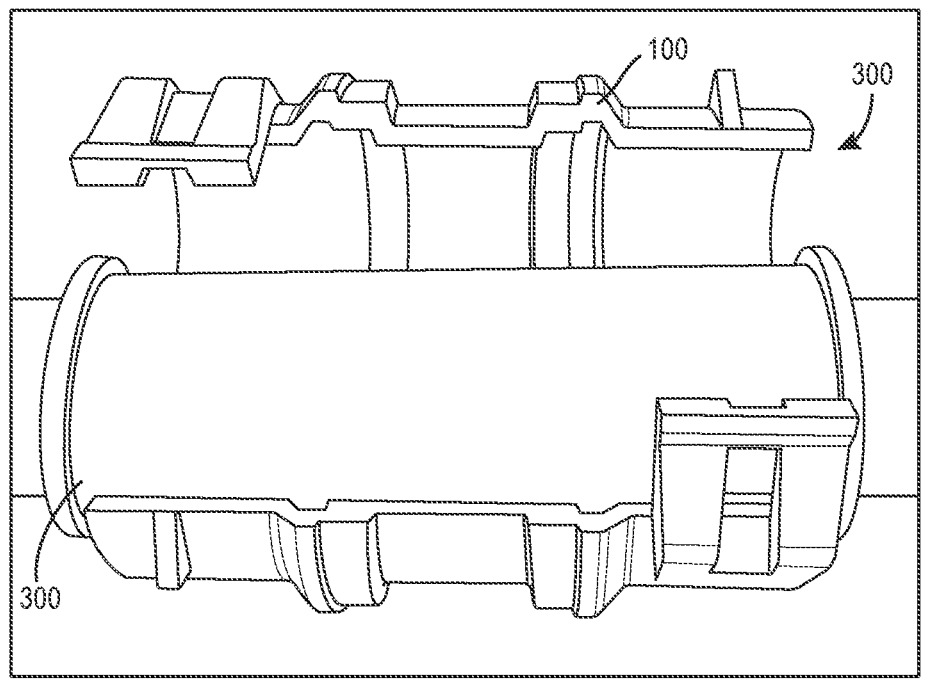
FIG. 6 is a perspective view of the connection assembly of FIG. 2 in a semi-assembled configuration engaged with the male electrical connector and the female electrical connector of FIG. 3A, according to an exemplary embodiment.
Figure 7:
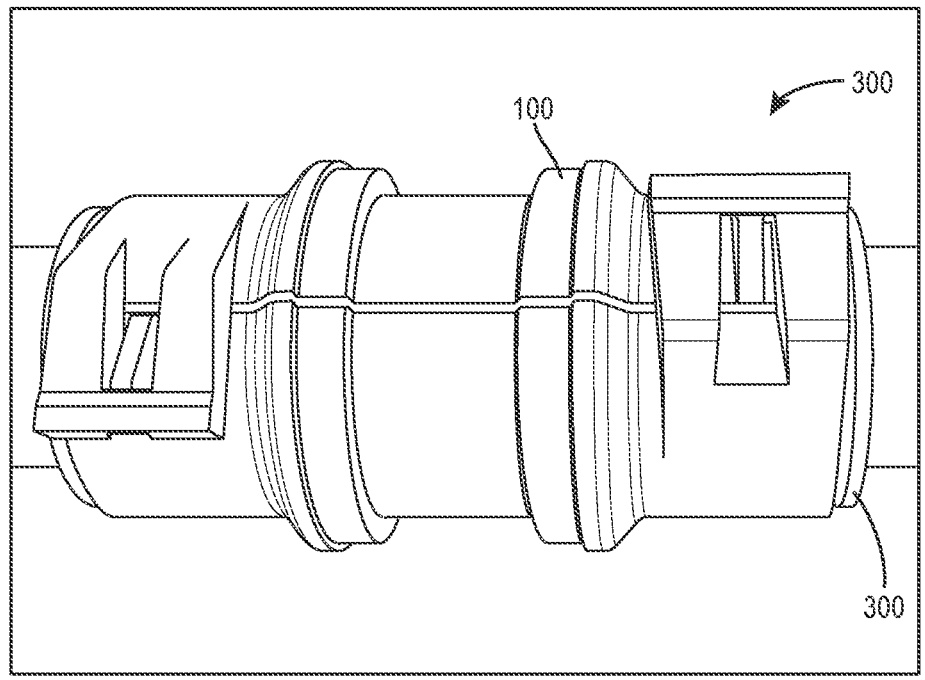
FIG. 7 is a perspective view of the connection assembly of FIG. 2 a fully-assembled configuration engaged with the male electrical connector and the female electrical connector of FIG. 5A, according to an exemplary embodiment.

Referring to FIGS. 6 and 7, the electrical connection assembly 300 is shown according to various embodiments. The electrical connection assembly 300 includes a sleeve 302 and a clamping connector assembly 100.

Figure 8A:
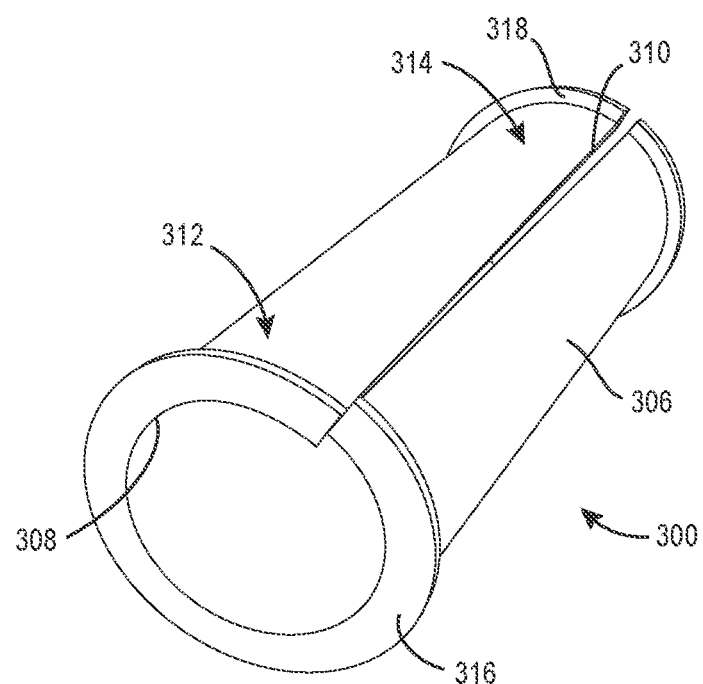
FIG. 8A is a perspective view of a first sleeve for use with the connection assembly of FIG. 2, according to an exemplary embodiment.
Figure 8B:
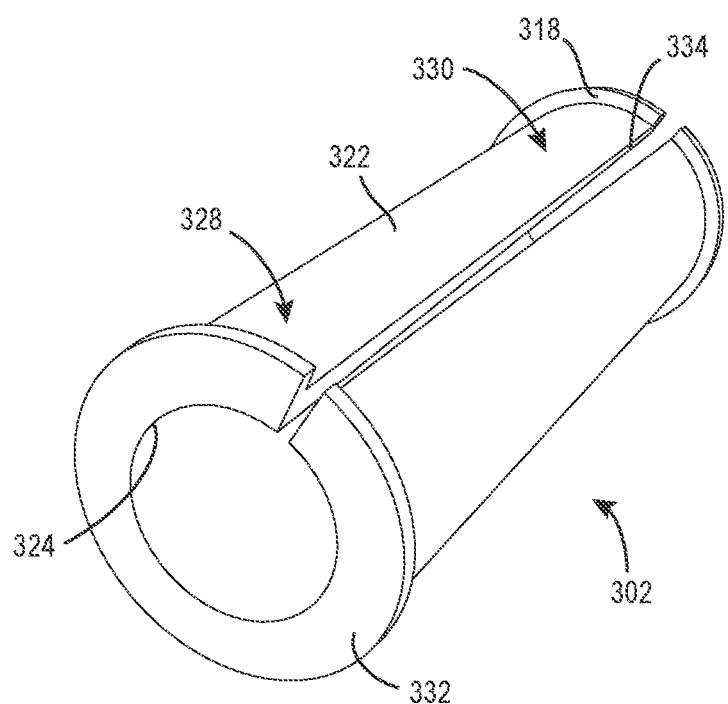
FIG. 8B is a perspective view of a second sleeve for use with the connection assembly of FIG. 2, according to an exemplary embodiment.

The sleeve 302 is shown according to various embodiments in FIGS. 8A and 8B. A first sleeve 302 and a second sleeve 304 are shown according to exemplary embodiments. The first sleeve 302 and the second sleeve 304 may include a flexible and compliant material that elastically deforms under tensile and/or compressive loading. In some embodiments, the first sleeve 302 and the second sleeve 304 are rubber sleeves. The first sleeve 302 and the second sleeve 304 each have a tubular main body, shown as main body 306 and main body 322. In some embodiments, the main body 306 and the main body 322 are substantially cylindrical. The main body 306 of the first sleeve 302 has an outer diameter $OD_1$, and the main body 322 of the second sleeve 304 has an outer diameter $OD_2$. In some embodiments, the outer diameters $OD_1$ and $OD_2$ are substantially equal. By way of example, the outer diameter of the main body 306 and the main body 322 may be sized to engage the inner surface of the clamping connector assembly 100. The main body 306 defines an elongated aperture, shown as connector aperture 308, extending through the entirety of the main body 306 and the main body 322 defines an elongated aperture, shown as connector aperture 324, extending through the entirety of the main body 322. The connector aperture 308 defines an inner diameter $ID_1$ of the first sleeve 302 and the connector structure 324 defines an inner diameter $ID_2$ of the second sleeve 304. In some embodiments, the inner diameter $ID_1$ is larger than the inner diameter $ID_2$. The first sleeve 302 and the second sleeve 304 each define a slot, shown as slit 310 and slit 326, respectively. The slit 310 and the slit 326 each extend longitudinally from a first end 312 to a second end 314 of the first sleeve 302 and a first end 328 to a second end 330 of the second sleeve 304, respectively. Although the slit 310 and the slit 326 are shown as being substantially straight, in other embodiments the slit 310 and the slit 326 are shaped otherwise (e.g., jagged, curved, etc.). A first flange 316, 332 and a second flange 318, 334 are coupled to (e.g., integrally formed with) the main body 306, 322 at the first end 312, 328 and the second end 314, 330, respectively. The first flange 316, 332 and the second flange 318, 334 extend radially outward from the main body 306, 322. Longitudinal movement of the clamping connector 100 relative to the first sleeve 302 or the second sleeve 304 is limited by the first flange 316, 332 and the second flange 318, 334.

Clamping Connector Assembly

Figure 9A:
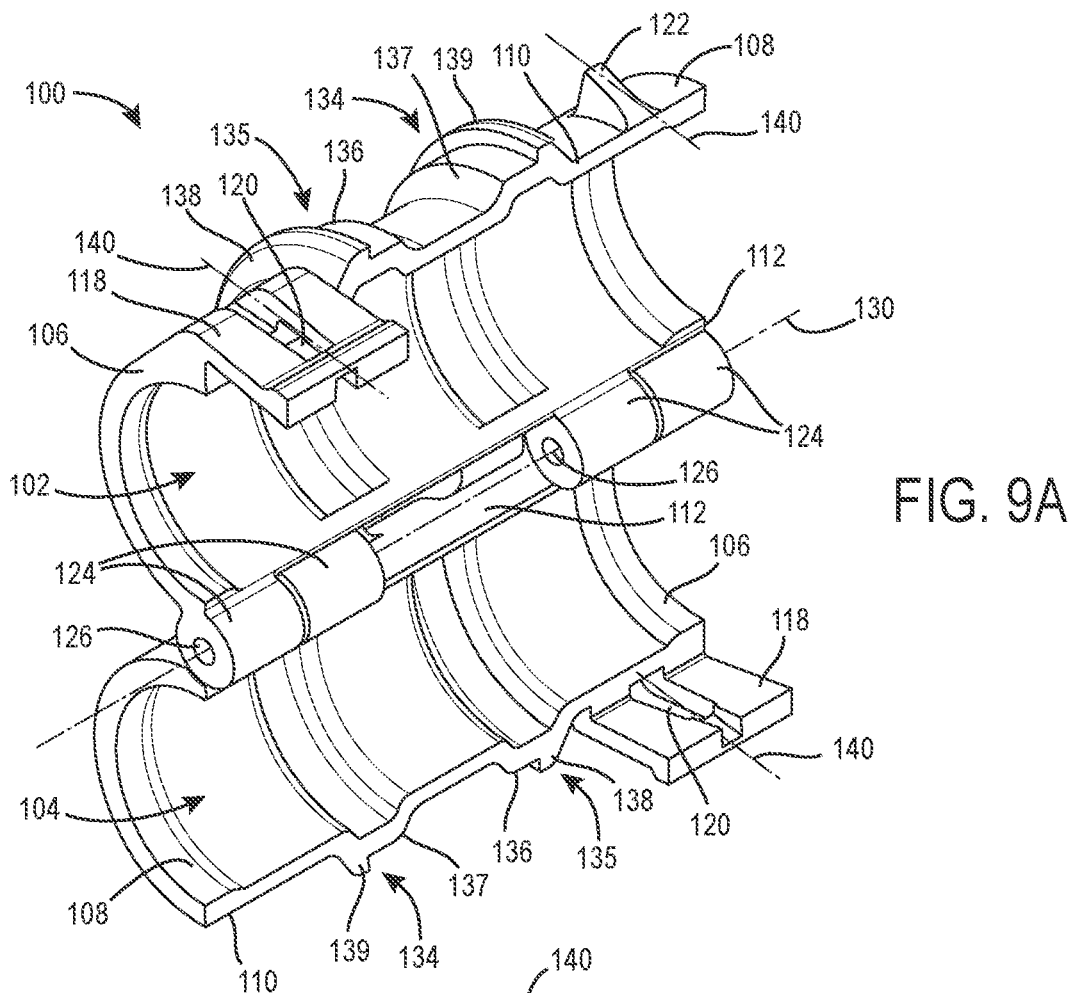
FIG. 9A is a perspective view of a clamping connector assembly in an open configuration, according to an exemplary embodiment.

Referring to FIG. 9A-10B, the clamping connector assembly 100 is shown according to an exemplary embodiment. For example, in one embodiment, the clamping connector assembly 100 is configured to encompass (e.g., partially or completely surround) two or more electrically coupled components and limit relative movement of those components within the clamping connector assembly 100. By limiting this movement, the clamping connector assembly 100 may limit the components from becoming electrically and/or mechanically decoupled over time by, for example, dampening vibration, or limiting ingress of debris or fluid. FIG. 9A shows an open configuration for the clamping connector 100. FIG. 9B shows a closed configuration for the clamping connector 100.

The clamping connector assembly 100 includes a first shell member 102 and a second shell member 104. By way of example, the first shell member 102 and the second shell member 104 may be made of a plastic (e.g., polyethylene terephthalate, polyethylene, etc.) or of another material (e.g., organic material, metal, etc.). The first shell member 102 has a half-cylindrical shape of a predetermined radius. The first shell member 102 has a first end portion 106, a second end portion 108 longitudinally opposite the first end portion 106, a first side 110, and a second side 112 radially opposite the first side 110. In some embodiments, the first shell member 102 and the second shell member 104 are substantially identical and formed from the same mold during manufacturing.

Figure 9B:
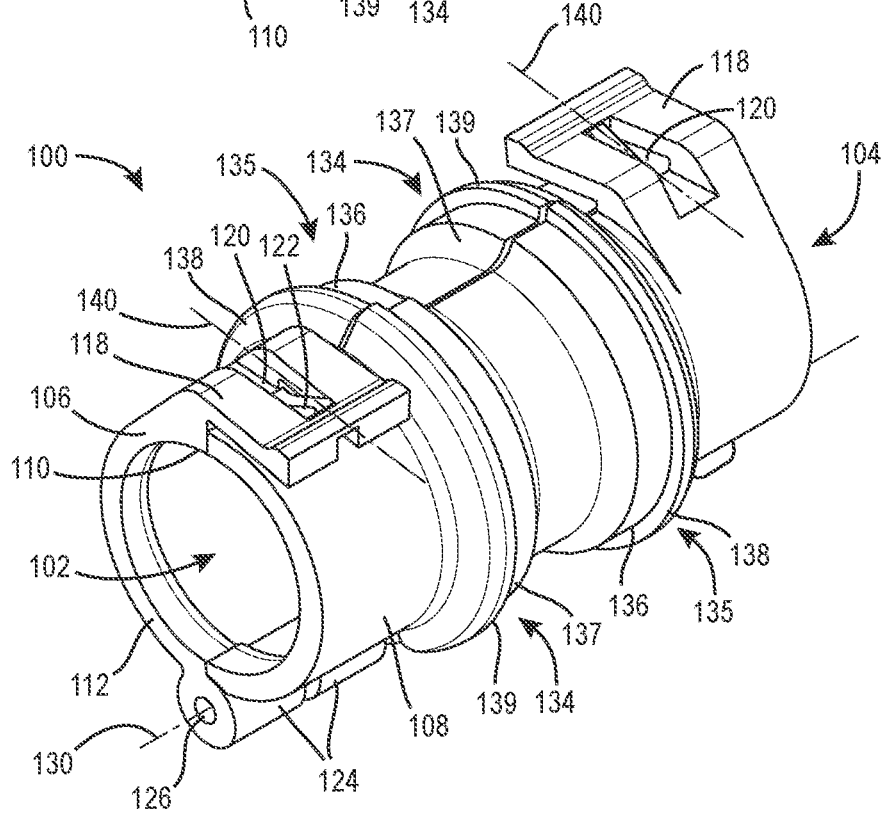
FIG. 9B is a perspective view of the clamping connector assembly of FIG. 9A in a closed configuration, according to an exemplary embodiment.

As shown in FIGS. 9A and 9B, the second side 112 includes a pair of elongated, longitudinally-extending protrusions, shown as hinge barrels 124. Each hinge barrel 124 defines an aperture, shown as hinge pin aperture 126, extending longitudinally therethrough. The hinge pin apertures 126 of the first shell member 102 and the second shell member 104 are aligned along a longitudinal axis or axis of rotation, shown as hinge axis 130. The hinge pin apertures 126 are configured to receive one or more hinge pins (e.g., a rod, a pin, etc.), pivotally coupling the first shell member 102 and the second shell member 104. Specifically, the hinge pins are centered about the hinge axis 130, and the first shell member 102 and the second shell member 104 are configured to rotate relative to one another about the hinge axis 130. By way of example, the clamping connector assembly 100 may include multiple hinge pins, each interfacing with one pair of the hinge barrels 124. In other embodiments, the hinge barrels 124 of the first shell member 102 are spaced apart from the hinge barrels 124 of the second shell member 104 in a longitudinally outward direction (e.g., the hinge barrels 124 of the first shell member 102 are closer to the ends of the clamping connector assembly 100). In yet other embodiments, the first shell member 102 and the second shell member 104 each have more or less than two hinge barrels 124 (e.g., one hinge barrel 124 each, three hinge barrels 124 each, etc.).

The first shell member 102 further includes varying outer diameter regions, shown as first step region 134 and second step region 135. The step region 134 is positioned along an entire radial periphery of the second end portion 108 and includes a first step 137 and a second step 139. The first step 137 is positioned outward relative to the second step 139. The step region 135 is positioned along an entire radial periphery of the first end portion 108 and includes a first step 136 and a second step 138. The first step 136 is positioned outward relative to the second step 138. The first step 136 of the second step region and the first step 137 of the first step region 134 are positioned between the second step 138 of the second step region 135 and the second step 139 of the first step region 134.

In some embodiments, while the connector clamp assembly 100 is in the closed configuration, the first step 136 of the second step region 135 and the first step 137 of the first step region 134 interface to define a surface to for an external device (e.g., a clamp) to couple to. The external device is positioned on the first step 136 and the first step 137 of the first shell member 102, and the first step 136 and the first step 137 of the second shell member 104. Further, the external device is limited from longitudinal translation by the second step 138 and the second step 139 of the first shell member 102, and the second step 138 and the second step 139 of the second shell member 104.

Figure 10A:
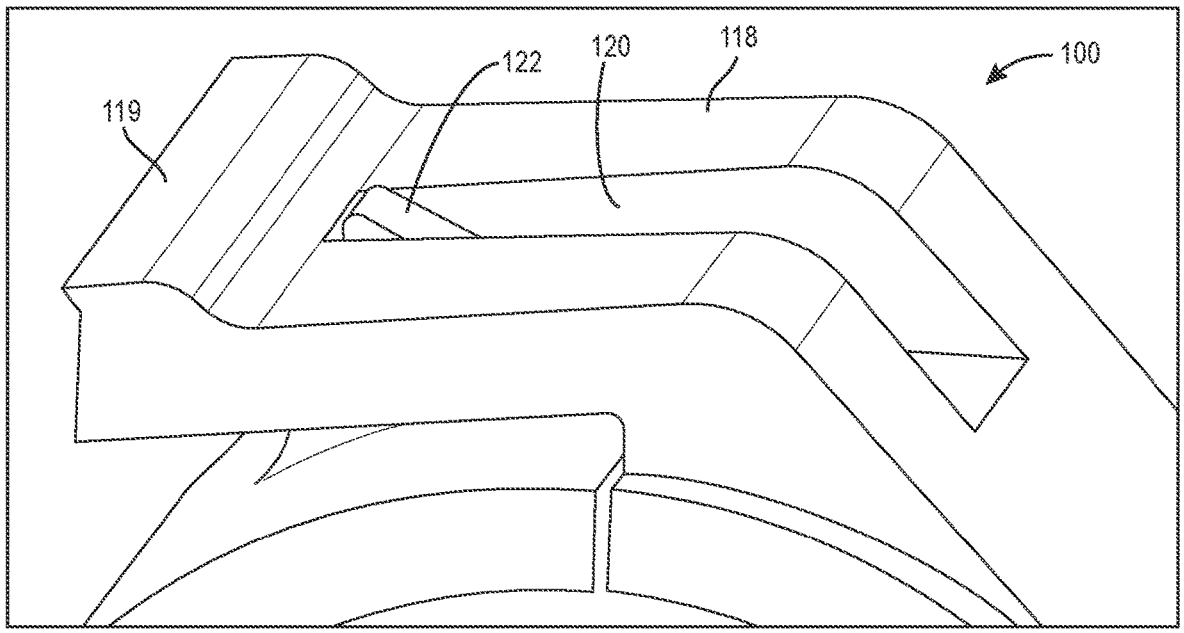
FIG. 10A is a perspective view of a locking tab and a pawl of the clamping connector assembly of FIG. 9B in the closed configuration, according to an exemplary embodiment.
Figure 10B:
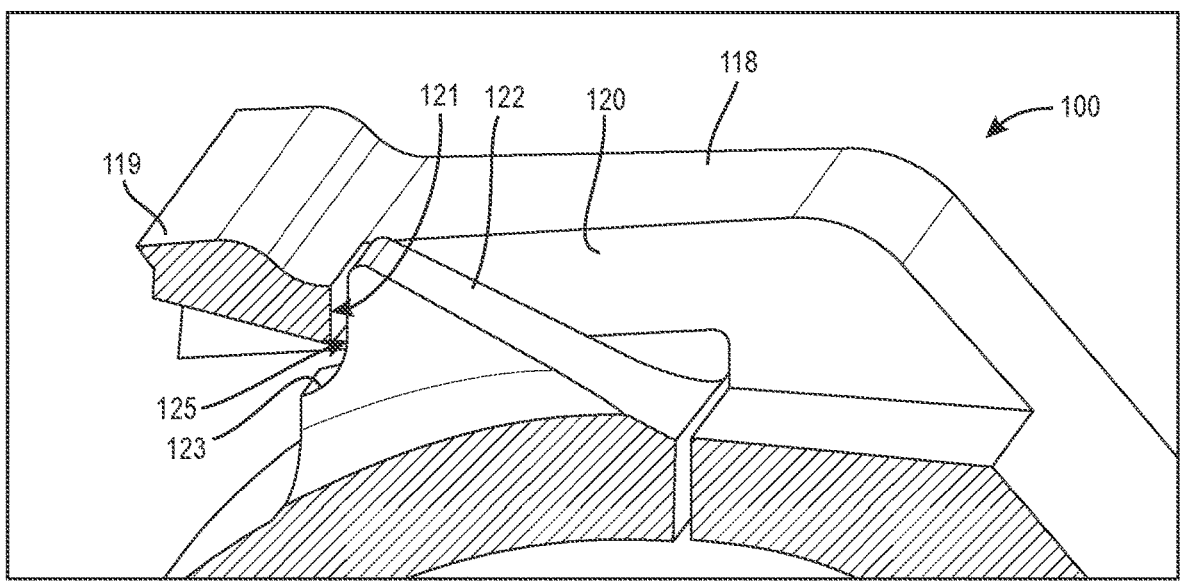
FIG. 10B is a section view of the locking tab and the pawl of FIG. 3A and the clamping connector assembly of FIG. 9B in the closed configuration, according to an exemplary embodiment.

As shown in FIGS. 10A-10B, the first shell member 102 and the second shell member 104 each include a first protrusion, shown as locking tab 118, extending tangentially outward from the first end portion 106 and the first side 110 of the corresponding shell member. Each locking tab 118 defines an aperture, shown as locking tab aperture 120. By way of example, the locking tab aperture 120 may be rectangular, circular, or triangular in shape. A region, shown as interface region 119, extends radially outward from the locking tab 118. Interface region 119 forms a surface to allow a user to selectively operate the clamping connector assembly 100 between the open configuration and the closed configuration. The interface region 119 may include a structural element (e.g., bump, textured surface, etc.) giving the user a mechanical advantage when applying force to the locking tab 118 and operating the clamping connector assembly 100.

The locking tab aperture 120 is configured to receive a second protrusion, shown as pawl 122, extending radially outward from the first side 110. The pawl 122 is positioned near the second end portion 108. The pawl 122 includes a notch 123 configured to accept a portion of the locking tab 118. When the clamping connector assembly 100 is in the closed configuration, the locking tab aperture 120 receives the pawl 122, specifically an inner face 121 of the locking tab 118 interfaces with an outer face 125 of the pawl 122 within the notch 123. The interface between locking tab inner face 121 and the pawl outer face 125 is configured to form a locking mechanism for the clamping connector assembly 100 when in the closed configuration. The locking tab inner face 121 pushes against the pawl outer face 125 and the pawl outer face 125 pushes against the locking tab inner face 121 such that no net force is formed and the clamping connector assembly 100 remains in the closed configuration until the user breaks the interface between the locking tab inner face 121 and the pawl outer face 125.

The clamping connector assembly 100 includes a tangential axis along which the locking tab 118 and the pawl 122 align and interface, shown as locking axis 140. The locking axis 140 of the first shell member 102 and locking axis 140 of the second shell member 104 align. The locking tab 118 of the first shell member 102 accepts the pawl 122 of the second shell member 104 through the locking tab aperture 120 and the locking tab 118 of the second shell member 104 accepts the pawl 122 of the first shell member 102 through the locking tab aperture 120. The interface of the locking tab 118 of the first shell member 102 to the pawl 122 of the second shell member 104, and the locking tab 118 of the second shell member 104 to the pawl 122 of the first shell member 102 limit the clamping connector assembly 100 from changing from the closed configuration to the open configuration. The first shell member 102 and the second shell member 104, when in the closed configuration, define an aperture whereby electrical wires (e.g., cables, etc.) may extend through, shown as wire aperture 142.

Figure 11:
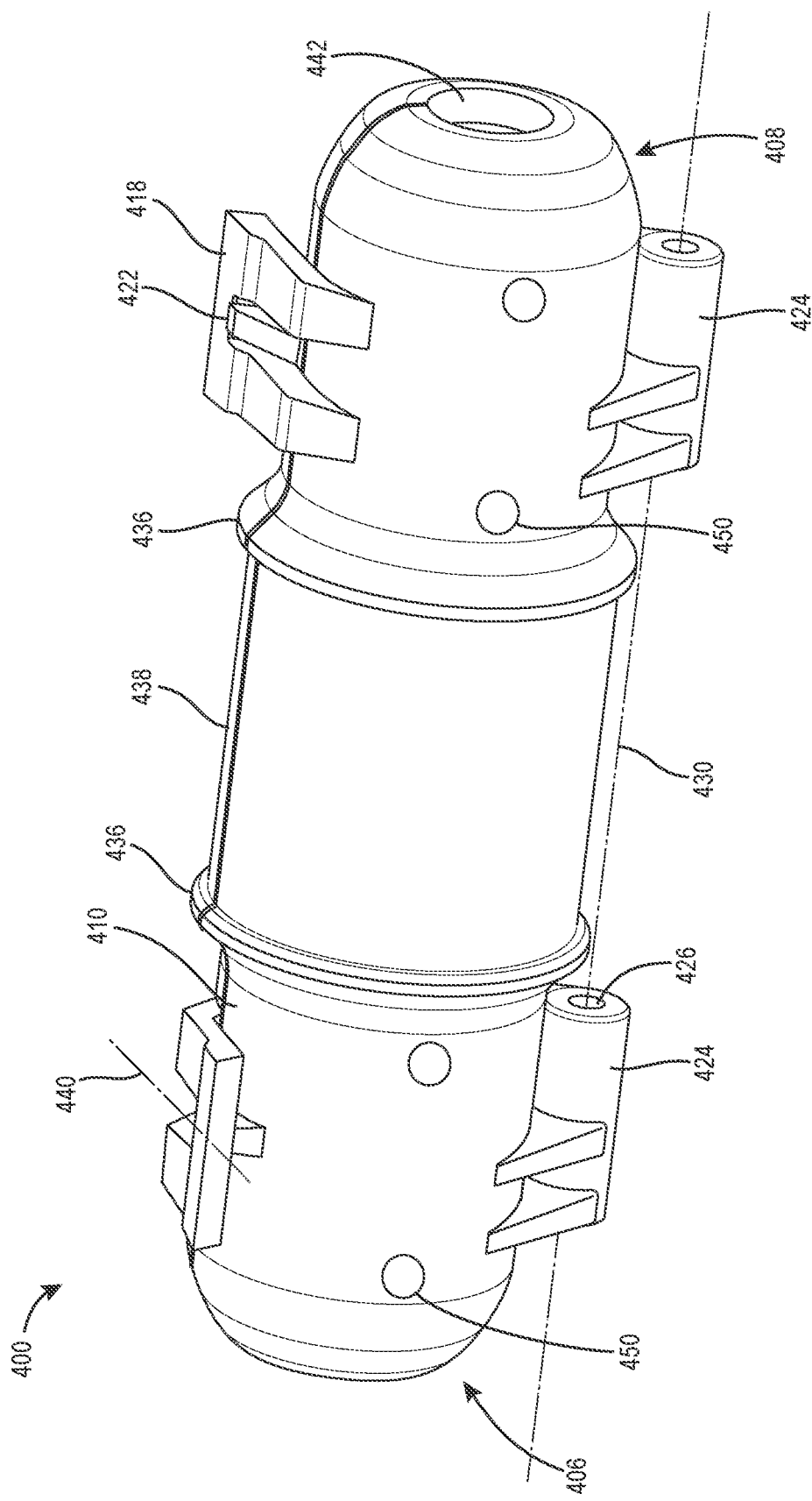
FIG. 11 is a perspective view of a clamping connector assembly in a closed configuration, according to an exemplary embodiment.
Figure 12:
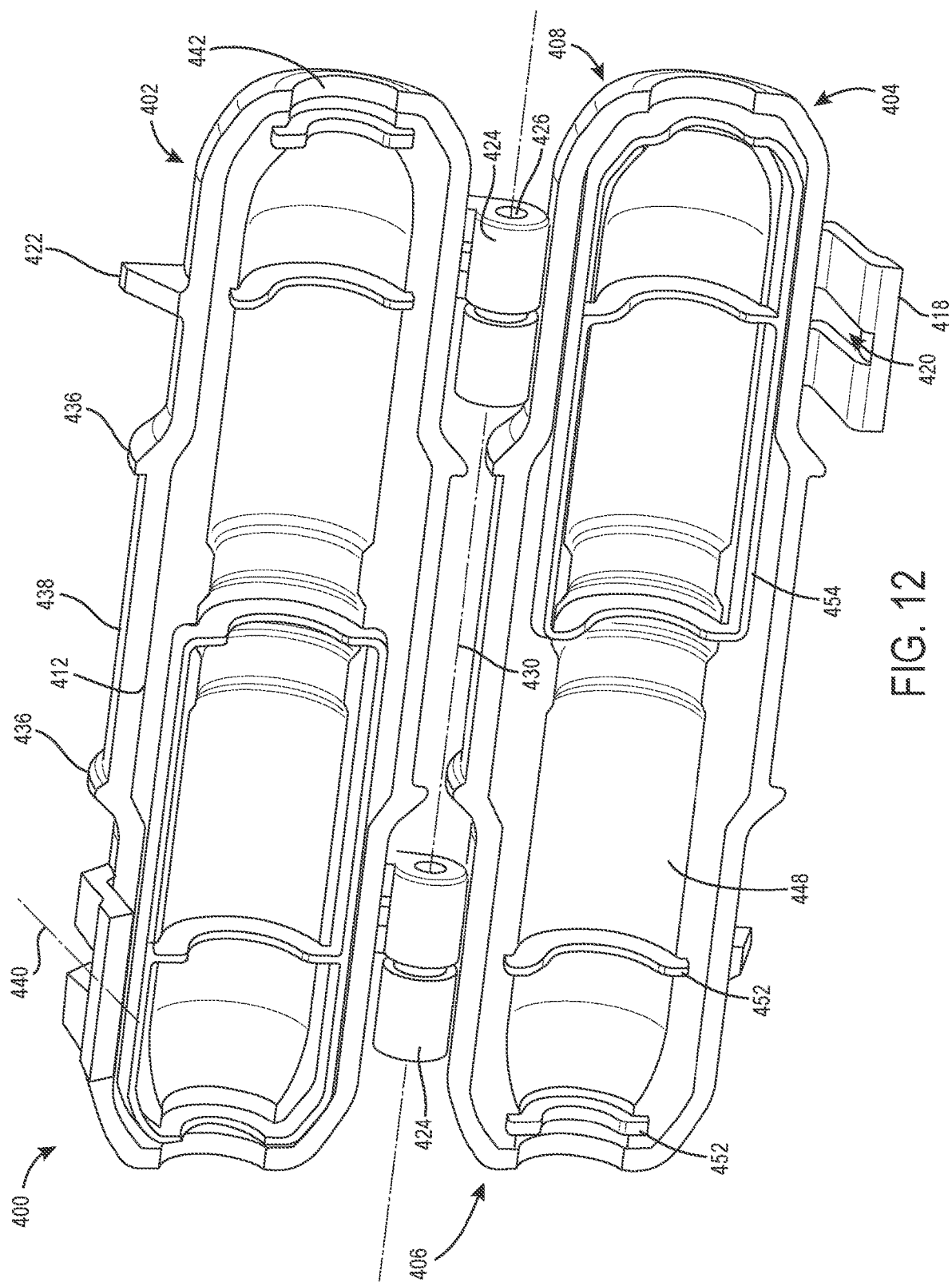
FIG. 12 is a perspective view of the clamping connector assembly in an open configuration, according to an exemplary embodiment.

Referring now to FIGS. 11-16, a clamping connector assembly 400 is shown according to one embodiment. The clamping connector assembly 400 may be used in a similar application and facilitate similar functions as the clamping connector assembly 100 (e.g., in a fire suppression system, etc.). The clamping connector assembly 400 may also be used to secure the first electrical connector 202 to the second electrical connector 204. The clamping connector assembly 400 may be installed during manufacturing or may be installed during installation of a fire suppression system. FIG. 11 depicts a closed configuration of the clamping connector assembly 400. FIG. 12 depicts an open configuration of the clamping connector assembly 400.

Figure 13:
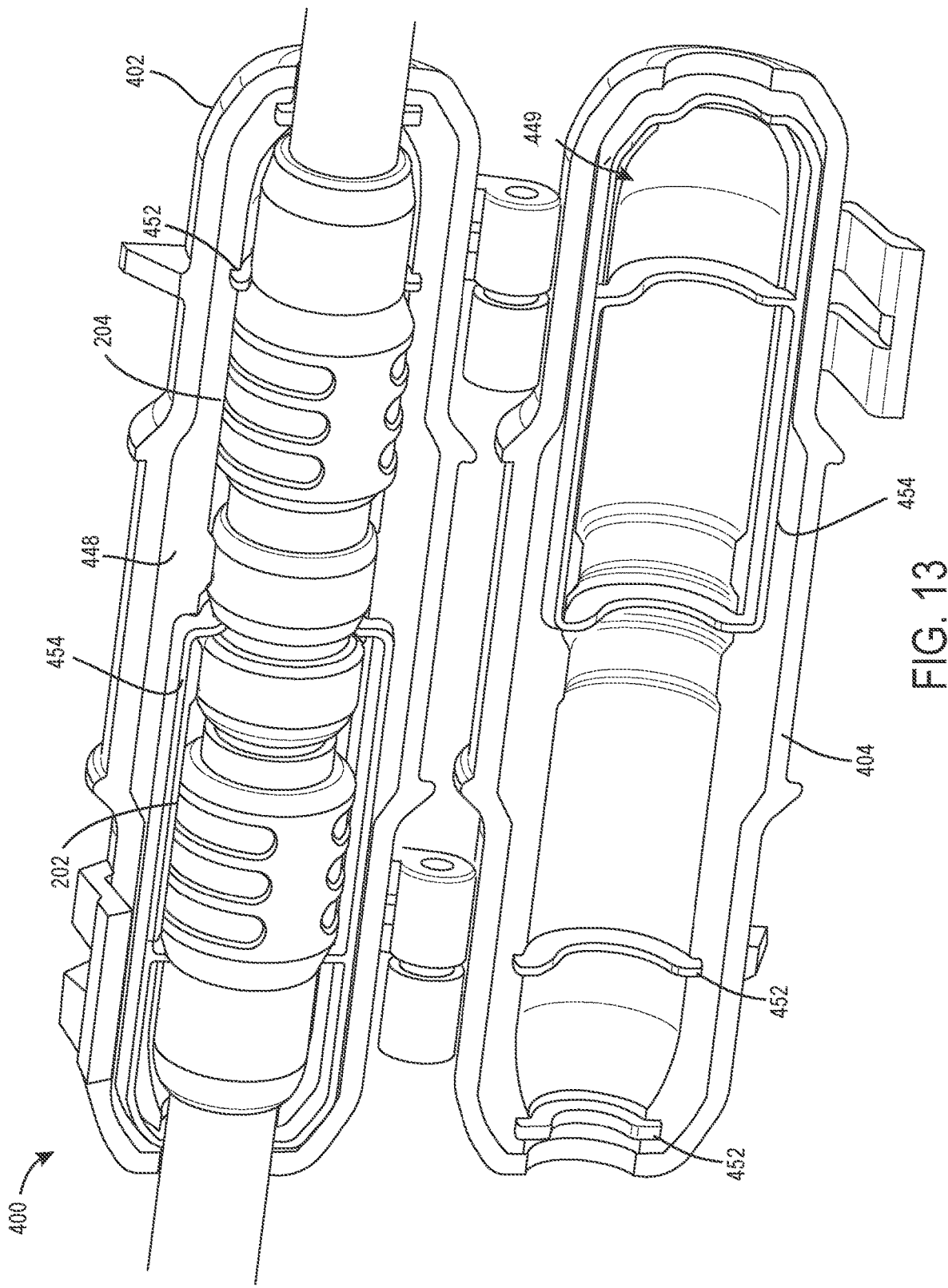
FIG. 13 is a perspective view of the clamping connector assembly accepting the male electrical connector and the female electrical connector in the fully connected configuration of FIG. 5A or 5B, according to an exemplary embodiment.

As shown in FIGS. 11-13 the clamping connector assembly 400 includes a first shell 402 and a second shell 404. The first shell 402 and the second shell 404 are coupled to form an outer enclosure (e.g., outer plastic clamp, etc.) of the clamping connector assembly 400. The first shell 402 and the second shell 404 may be formed of plastic or of metal, and therefore be rigid. The first shell 402 and the second shell 404 may be formed from the same mold during manufacturing, therefore the first shell 402 and the second shell 404 are identical. The first shell 402 and the second shell 404 may be sized to accept specific sized connectors (e.g., M12 connectors, M16 connectors, etc.). The size of the first shell 402 and the second shell 404 may be changed during manufacturing to accept various sizes of connectors. The clamping connector assembly 400 also defines a first end portion 406 and a second end portion 408. The first end portion 406 is opposite the second end portion 408 along a length of the clamping connector assembly 400. As shown in FIG. 11, a cable or wire aperture 442 may be defined between the first shell 402 and the second shell 404 while in the closed configuration. The wire aperture 442 is sized to accept a connector (e.g., first electrical connector 202, second electrical connector 204, etc.). The size of the wire aperture 442 may be changed during manufacturing to accept various sizes of connectors. As shown in FIGS. 12 and 13, the clamping connector assembly 400 also includes a first side 410 (e.g., an exterior side) and a second side 412 (e.g., an interior side).

In some embodiments, the second side 412 includes a pair of elongated, longitudinally-extending protrusions, shown as hinge barrels 424. Each hinge barrel 424 defines an aperture, shown as hinge pin aperture 426, extending longitudinally through the hinge barrel 424. The hinge pin apertures 426 of the first shell member 402 and the second shell member 404 are aligned along a longitudinal axis or axis of rotation, shown as hinge axis 430. The hinge pin apertures 426 are configured to receive one or more hinge pins (e.g., a rod, a pin, etc.), pivotally coupling the first shell member 402 and the second shell member 404. Specifically, the hinge pins are centered about the hinge axis 430, and the first shell member 402 and the second shell member 404 are configured to rotate relative to one another about the hinge axis 430. The clamping connector assembly 400 may include multiple hinge pins, each interfacing with one pair of the hinge barrels 424. In other embodiments, the hinge barrels 424 of the first shell member 402 are spaced apart from the hinge barrels 424 of the second shell member 404 in a longitudinally outward direction (e.g., the hinge barrels 424 of the first shell member 402 are closer to the ends of the clamping connector assembly 400). In yet other embodiments, the first shell member 402 and the second shell member 404 each have more or less than two hinge barrels 424 (e.g., one hinge barrel 424 each, three hinge barrels 424 each, etc.).

Figure 14:
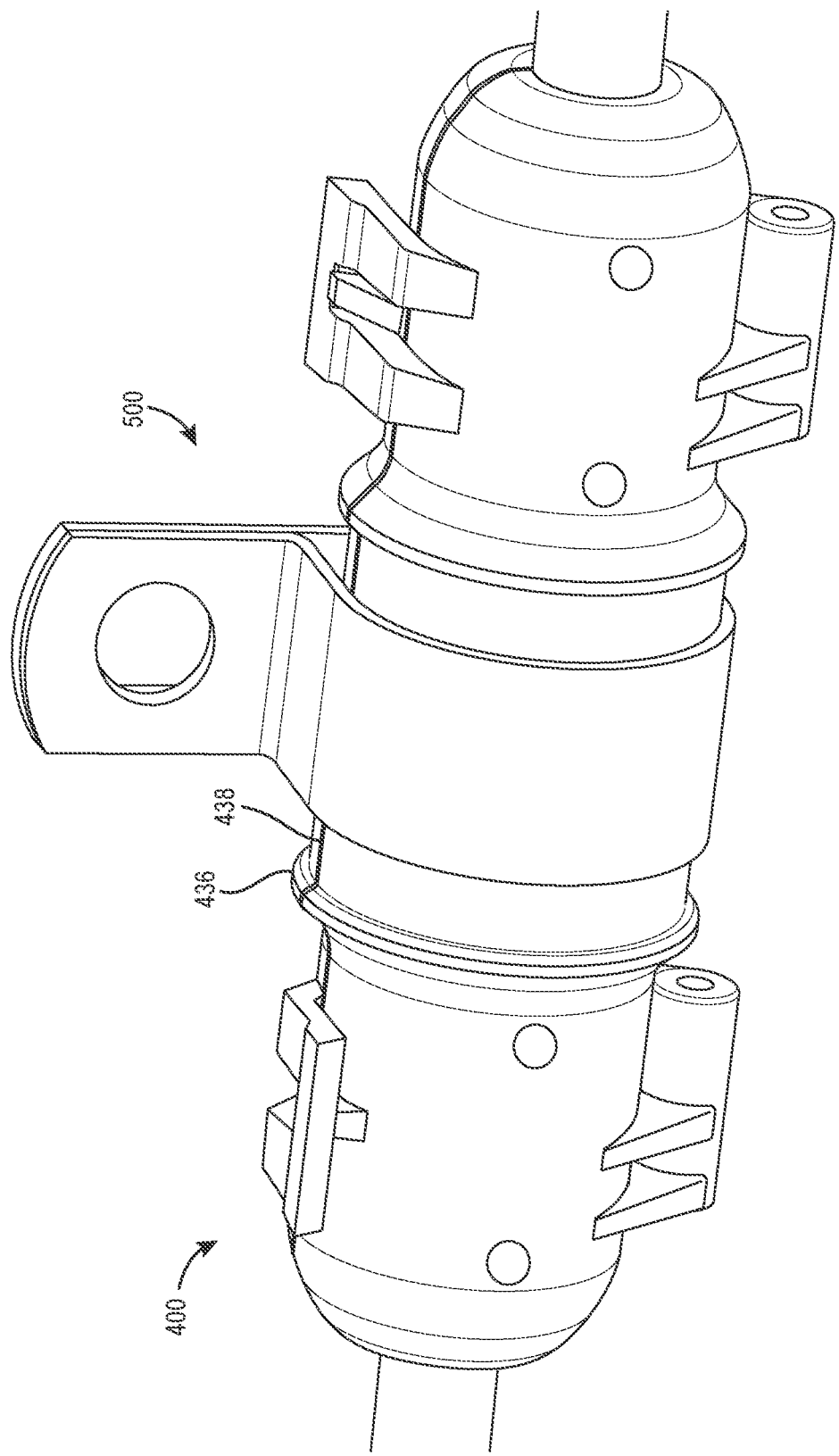
FIG. 14 is a perspective view of the clamping connector of FIG. 11 coupled to a c-clamp, according to an exemplary embodiment.
Figure 15:
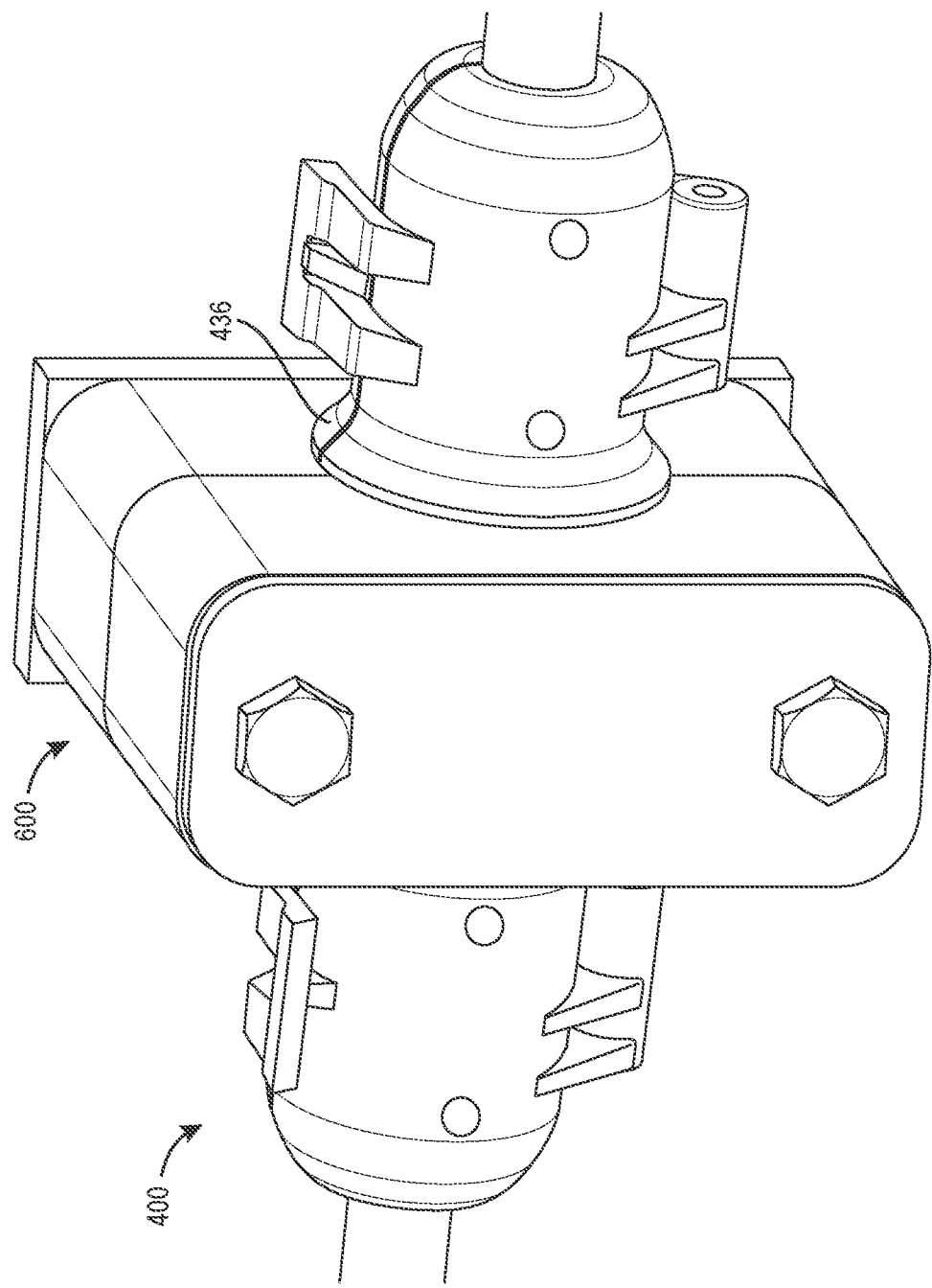
FIG. 15 is a perspective view of the clamping connector of FIG. 11 coupled to a clamp, according to an exemplary embodiment.

The first shell member 402 further includes varying outer diameter regions, shown as first steps 436 and a second step 438. The first steps 436 are displaced outward (e.g., closer to the first end 404 and the second end 406) relative to the second step 438. The first steps 436 and the second step 438 are positioned on the first side 410 of the first shell 402 and extend around a periphery of the first shell 402. The first steps 436 are raised relative to the second step 438. While in the closed position, the first steps 436 and the second step 438 of the first shell member 402 interface with the first steps 436 and the second step 438 of the second shell member 494 to define varying outer diameters of the clamping connector assembly 400. As shown in FIGS. 14 and 15, the first steps 436 and the second step 438 of the first shell member 402 and the second shell member 404 can accept various clamping methods. A c-clamp 500 may be positioned between the first steps 436 and interface with the second step 438. The c-clamp 500 may be spaced from the first steps 436. A clamp 600 may be positioned between the first steps 436 and interface with the second step 438. The clamp 600 extends at least partially between the first steps 436 to limit movement along the length of the connector clamp assembly 400. The c-clamp 500 and the clamp 600 may couple the clamping connector assembly 400 to an external component or surface.

As shown in FIG. 11, the first shell member 402 may include seal apertures 450. The seal apertures 450 extend from the first side 410 to the second side 412. The seal apertures 450 may be positioned closer to the first end portion 406 and the second end portion 408 than the first step 436 and the second step 438. The clamping connector assembly 400 includes a seal 448 (e.g., a molded component, a molded rubber component, a gasket, an inner molded component, etc.). The seal 448 may be formed of a compressible material, such as rubber. The seal 448 is structured to limit ingress of debris (e.g., dirt, mud, dust, etc.) or water into the interior of the clamping connector assembly 400 that may disrupt the connection between the first electrical connector 202 and the second electrical connector 204. The seal 448 is also structured to limit movement of the first electrical connector 202 relative to the second electrical connector 204, which limits disconnection of the first electrical connector 202 from the second electrical connector 204. The seal 448 also may dampen vibrations to further limit disconnection of the first electrical connector 202 from the second electrical connector 204.

Figure 16:
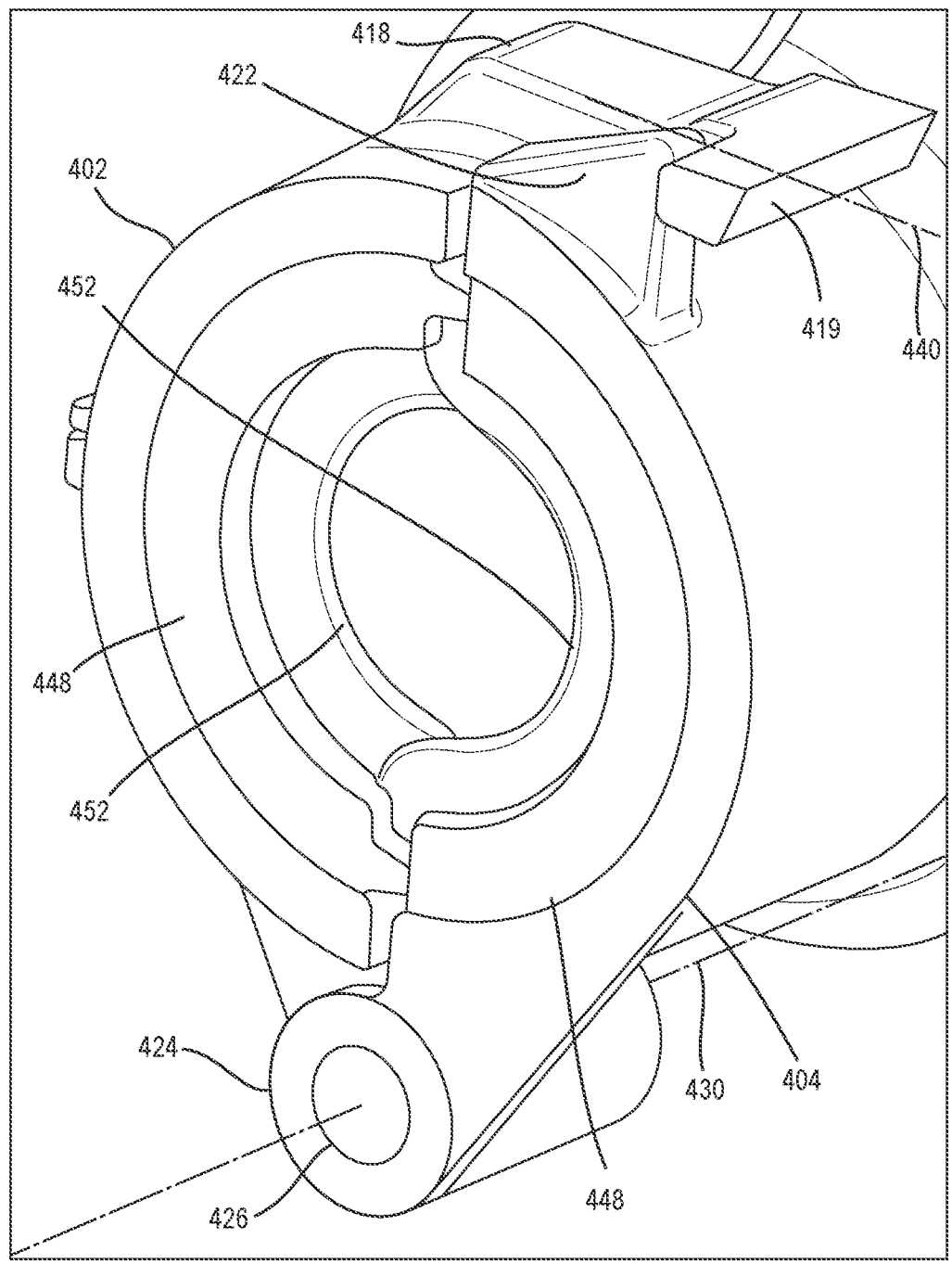
FIG. 16 is a partial section view of the clamping connector of FIG. 11, according to an exemplary embodiment.

As shown in FIGS. 12-13 and 16, the seal 448 is positioned on the second side 412 (e.g., the interior, etc.) of the clamping connector assembly 400 while in the closed configuration. The seal 448 may cover an entire inner side (e.g., second side 412, etc.) of the first shell member 402 and second shell member 404. A portion of the seal 448 extends through the seal apertures 450 such that when the clamping connector assembly 400 is in the closed configuration, the seal 448 is visible via the seal apertures 450. The seal apertures 450 are structured to further fixedly couple the seal 448 to the first shell member 402. An adhesive may be utilized to fixedly couple the seal 448 to the first shell member 402 or the seal aperture 450. The seal 448 may also form a pressure fit within the seal apertures 450.

The seal 448 may include various features to accept the first electrical connector 202 or the second electrical connector 204, as shown in FIGS. 12 and 13. The seal 448 defines a cavity 449 along a length. The cavity 449 has features similar to the first electrical connector 202 and the second electrical connector 204 to limit movement of the first electrical connector 202 and the second electrical connector 204 relative to the seal 448. These features are shown as first protrusions 452 (e.g., ribs, etc.) and second protrusion 454 defined by the seal 448. The first protrusions 452 extend into the cavity 449 to interface with features (e.g., gaps, smaller diameter sections, etc.) of the first electrical connector 202 and/or the second electrical connector 204. The second protrusion 454 is positioned along the cavity 449 to interface with other features (e.g., larger diameter sections, knurled sections, etc.) of the first electrical connector 202 and the second electrical connector 204. The second protrusion 454 are also structured to interface with a second seal 448. When in the closed position, the first protrusions 452 and the second protrusion 454 of a first seal 448 interface with the first protrusions 452 and the second protrusion 454 of a second seal 448 to create a full seal. The first protrusions 452 of the first seal 448 may be offset from the first protrusions 452 of the second seal 448 to limit compression of the first protrusions 448 of the first seal 448 or the second seal 448, shown in FIG. 16. The second protrusion 454 of the first seal 448 may be positioned at the first end portion 106 and the second protrusion 454 of the second seal 448 may be positioned at the second end portion 108. The second protrusion 454 of the first seal 448 and the second protrusion 454 of the second seal 448 interface to form a full seal from the first end region 106 to the second end region 108 while in the closed position.

Referring to FIG. 16, the first shell member 402 and the second shell member 404 each include a first protrusion, shown as locking tab 418, extending tangentially outward from the first end portion 406 of the corresponding shell member. Each locking tab 418 defines an aperture, shown as locking tab aperture 420. The locking tab aperture 420 may be rectangular, circular, triangular, or shaped otherwise. A region, shown as interface region 419 (see FIG. 14), extends radially outward from the locking tab 418. Interface region 419 is configured to facilitate ease of operation (e.g., selectively operating the clamping connector assembly 400 between the open configuration and the closed configuration) for the user. The interface region 419 forms a surface to allow a user to selectively operate the clamping connector assembly 400 between the open configuration and the closed configuration. The interface region 419 may include a structural element (e.g., bump, textured surface, etc.) giving the user a mechanical advantage when applying force to the locking tab 418 and operating the clamping connector assembly 400.

The locking tab aperture 420 is configured to receive a second protrusion, shown as pawl 422, extending radially outward from the first side 410. The pawl 422 is positioned near the second end portion 408. When the clamping connector assembly 400 is in the closed configuration, the locking tab aperture 420 receives the pawl 422. The interface between the locking tab 418 and the pawl 422 forms a locking mechanism for the clamping connector assembly 400 when in the closed configuration limiting the clamping connector assembly 400 from translating to the open configuration.

As shown in FIG. 16, the clamping connector assembly 400 includes a tangential axis along which the locking tab 418 and the pawl 422 align and interface, shown as locking axis 440. The locking axis 440 of the first shell member 402 and locking axis 440 of the second shell member 404 align when in a closed position. The locking tab 418 of the first shell member 402 accepts the pawl 422 of the second shell member 404 through the locking tab aperture 420 and the locking tab 418 of the second shell member 404 accepts the pawl 422 of the first shell member 402 through the locking tab aperture 420. The interface of the locking tab 418 of the first shell member 402 to the pawl 422 of the second shell member 404, and the locking tab 418 of the second shell member 404 to the pawl 422 of the first shell member 402 limit the clamping connector assembly 400 from translating from the closed configuration to the open configuration undesirably.

Method for Attachment

An electrical connection is made by removably coupling the first electrical connector 202 to the second electrical connector 204 (e.g., bus cables, linear detectors, detection cables, etc.). A diameter of a first type of connector may be different than a diameter of a second type of connector, therefore multiple sizes of the clamping connector assembly 100 and/or 400 are manufactured to accept various diameters of the first electrical connector 202 and the second electrical connector 204. In one embodiment, two sizes of the clamping connector assembly 100 and/or 400 are manufactured to accept two diameters of cables. The electrical connection facilitates transmittance of electrical signals between the plurality of components of the fire suppression system 10 (e.g., the controller 26, the manual activation system 30, the human interface device 38, the temperature sensors 28, the actuator 20, etc.).

By way of example, removably coupling the first electrical connector 202 to the second electrical connector 204 is accomplished by means of soldering, plugging, twisting, taping, etc. In another embodiment, the first electrical connector 202 and the second electrical connector 204 are permanently coupled. The first electrical connector 202 and the second electrical connector 204 are further coupled by means of engaging the second threading of the first electrical connector 202 to the first threading 406 of the second electrical connector 204. In some embodiments, the threading may be replaced by any other coupling mechanism (e.g., adhesive, welding, soldering, etc.).

In some examples, the electrical wire connection is further secured by removably coupling the sleeve to the first electrical connector 202 and the second electrical connector 204. Removably coupling the sleeve to the connection between the first electrical connector 202 and the second electrical connector 204 allows for means of damping vibrations and for protection against harsh elements (e.g., dirt, mud, etc.). By way of example, the sleeve (e.g., the first sleeve 302, the second sleeve 304, etc.) is not adhered to the first electrical connector 202 or the second electrical connector 204. In another embodiment, the sleeve is adhered (e.g., glue, tape, etc.) to at least one of the first electrical connector 202 and the second electrical connector 204. In other examples, the electrical wire connection is accepted by the seal 448. The electrical wire connection interfaces with the first protrusions 452 and the second protrusions 454 to limit movement of the electrical wire connection relative to the seal 448.

In some examples, the electrical wire connection includes the clamping connector assembly 100 which is removably coupled to the sleeve, further isolating the electrical wire connection from harsh elements and vibrations. The clamping connector assembly 100 is configured to be removably coupled (e.g., clamped, bolted, etc.) to the sleeve. In other examples, the electrical wire connection includes the clamping connector assembly 400. The clamping connector assembly 400 includes the seal 448. By way of example, the clamping connector assembly 100 and 400 is configured to be selectively repositioned from the open configuration to the closed configuration and the closed configuration to the open configuration by the user using a single hand or using both hands. While in the closed configuration, the sleeve or the seal 448 is compressed against the first electrical connector 202 and the second electrical connector 204 by the first shell member 102 or 402 and the second shell member 104 or 404, respectively. The sleeve and the seal 448, when compressed against the first electrical connector 202 and the second electrical connector 204, limit ingress of debris (e.g., dirt, mud, dust, etc.) or fluid (e.g., water, oil, etc.) and dampen vibration to lower quick accelerations experienced by the first electrical connector 202 and the second electrical connector 204. Therefore, the sleeve and the seal 448, when in the closed configuration, interface with the first electrical connector 202 and the second electrical connector 204 to seal from an external environment and limit disconnection of the first electrical connector 202 from the second electrical connector 204. In some examples, the sleeve or the seal 448 interfaces with (e.g., clamps, etc.) wires and/or a body of the first electrical connector 202 and the second electrical connector 204. In some examples, the clamping connector assembly 100 and/or 400 forms full coverage of the first electrical connector 202 and the second electrical connector 204. For example, a body of the first electrical connector 202 and the second electrical connector 204 is completely covered by the clamping connector assembly 100 or 400. Only wires of the first electrical connector 202 and the second electrical connector 204 are able to be interfaced with.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the seal 448 in FIG. 11-13 may be incorporated on the clamping connector assembly 100 of the exemplary embodiments in FIGS. 6-10B. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A clamping connector, comprising:
    a first shell member and a second shell member, each comprising:
        a tab extending from a first side and defining a tab aperture;
        a protrusion extending from the first side;
        a hinge aperture oriented along on a second side;
        wherein when the first shell member is secured to the second shell member the protrusion of the first shell member extends into the tab aperture of the tab of the second shell member and the protrusion of the second shell member extends into the tab aperture of the tab of the first shell member; and
        a hinge pin received by the hinge apertures of the first and second shell members to rotatably couple the first shell member and the second shell member;
    at least one seal; and
    a plurality of seal apertures extending from an interior of the clamping connector to an exterior of the clamping connector, wherein the at least one seal extends partially through the plurality of seal apertures to fixedly couple the at least one seal to an inner side of the clamping connector.

2. The clamping connector of claim 1, wherein a step region extends about a periphery of the clamping connector and includes a first step and a second step defining varied diameter portions configured to receive a mounting clamp.

3. The connector clamp of claim 1, wherein the clamping connector is configured to enable a user to secure the first shell member to the second shell member using a single hand.

4. The clamping connector of claim 1, wherein the first shell member and the second shell member are identical in size and shape.

5. The clamping connector of claim 1, wherein the at least one seal comprises a first seal and a second seal;
    wherein the plurality of seal apertures comprises first apertures and second apertures; and
    wherein the first seal extends partially through the first apertures, the first apertures being defined through the first shell member to fixedly couple the first seal to an inner side of the first shell member and the second seal extends partially through the second apertures, the second apertures being defined through the second shell member to fixedly couple the second seal to an inner side of the second shell member.

6. The clamping connector of claim 5, wherein the first seal covers substantially an entire inner surface of the first shell member and is made of a compressible material configured to interface with an electrical connector and the second seal, and wherein the second seal covers substantially an entire inner surface of the second shell member and is made of a compressible material configured to interface with the electrical connector and the first seal.

7. A connection assembly comprising:
    a first electrical connector;
    a second electrical connector configured to engage the first electrical connector; and a clamping connector assembly including a seal and a clamping connector, wherein the clamping connector is configured to cover the entirety of the first and second electrical connectors and compress the seal about the first and second electrical connectors and prevent disengagement of the first and second electrical connectors;

wherein the clamping connector defines seal apertures extending from an interior to an exterior, wherein the seal extends partially through the seal apertures to fixedly couple the seal to an inner side of the clamping connector.

8. The connection assembly of claim 7, wherein the first electrical connector and the second electrical connector are further coupled with threading.

9. The connection assembly of claim 7, wherein the seal includes ribs and protrusions to interface with gaps and knurled portions of the first electrical connector and the second electrical connector to limit movement of the first electrical connector and the second electrical connector relative to the seal and to limit ingress of fluid or debris into the connection assembly.

10. The connection assembly of claim 7, wherein the clamping connector includes first steps defining a first outer diameter and a second step defining a second outer diameter, wherein the first steps are located closer to ends of the clamping connector than the second step, the first outer diameter being larger than the second outer diameter, wherein the second step accepts a clamp and the first steps limit movement of the clamp along a length of the clamping connector.

11. The connection assembly of claim 7, wherein the seal covers substantially an entire inner surface of the clamping connector and is made of a compressible material.

12. The connection assembly of claim 7, wherein the connection assembly is configured to prevent loss of electrical connection between the first electrical connector and the second electrical connector due to water ingress or vibrations.

13. The connection assembly of claim 7, wherein the clamping connector is formed of a first shell member and a second shell member, the first shell member and the second shell member being identical in shape and size.

14. A method of connecting a plurality of electrical connectors, comprising;
selectively coupling a first electrical connector to a second electrical connector to create a connection;
engaging a first threading of the first electrical connector to a second threading of the second electrical connector; and
removably coupling a clamping connector assembly to limit relative rotation of the first and second electrical connectors, wherein the clamping connector assembly includes a clamping connector having a seal substantially surrounding the first and second electrical connectors;
wherein the clamping connector defines seal apertures extending from an interior to an exterior, wherein the seal extends partially through the seal apertures to fixedly couple the seal to an inner side of the clamping connector.

15. The method of claim 14, wherein the seal includes ribs and protrusions to interface with gaps and knurled portions of the first electrical connector and the second electrical connector to limit movement of the first electrical connector and the second electrical connector relative to the seal and to limit ingress of fluid or debris into the clamping connector.

16. The method of claim 14, wherein the clamping connector includes first steps defining a first outer diameter and a second step defining a second outer diameter, the first steps are located closer to ends of the clamping connector than the second step, the first outer diameter being larger than the second outer diameter, wherein the second step accepts a clamp and the first steps limit movement of the clamp along a length of the clamping connector.

17. The method of claim 14, wherein the clamping connector includes a pawl and a locking tab defining a locking tab aperture, wherein the pawl extends through the locking tab aperture of the locking tab to limit movement of the pawl relative to the locking tab.

18. The method of claim 14, wherein the clamping connector comprises a first shell member and a second shell member, wherein the first shell member and the second shell member are identical in size and shape.

19. The clamping connector of claim 1, wherein each of the first seal and the second seal comprises a first protrusion and a second protrusion spaced from the first protrusion.

20. The clamping connector of claim 19, wherein the first protrusion and the second protrusion of the first seal are structured to interface with the first protrusion and the second protrusion of the second seal.

* * * * *